S. RICHARDS.
Car-Track Clearer.
No. 2,672. Reissued July 9, 1867.
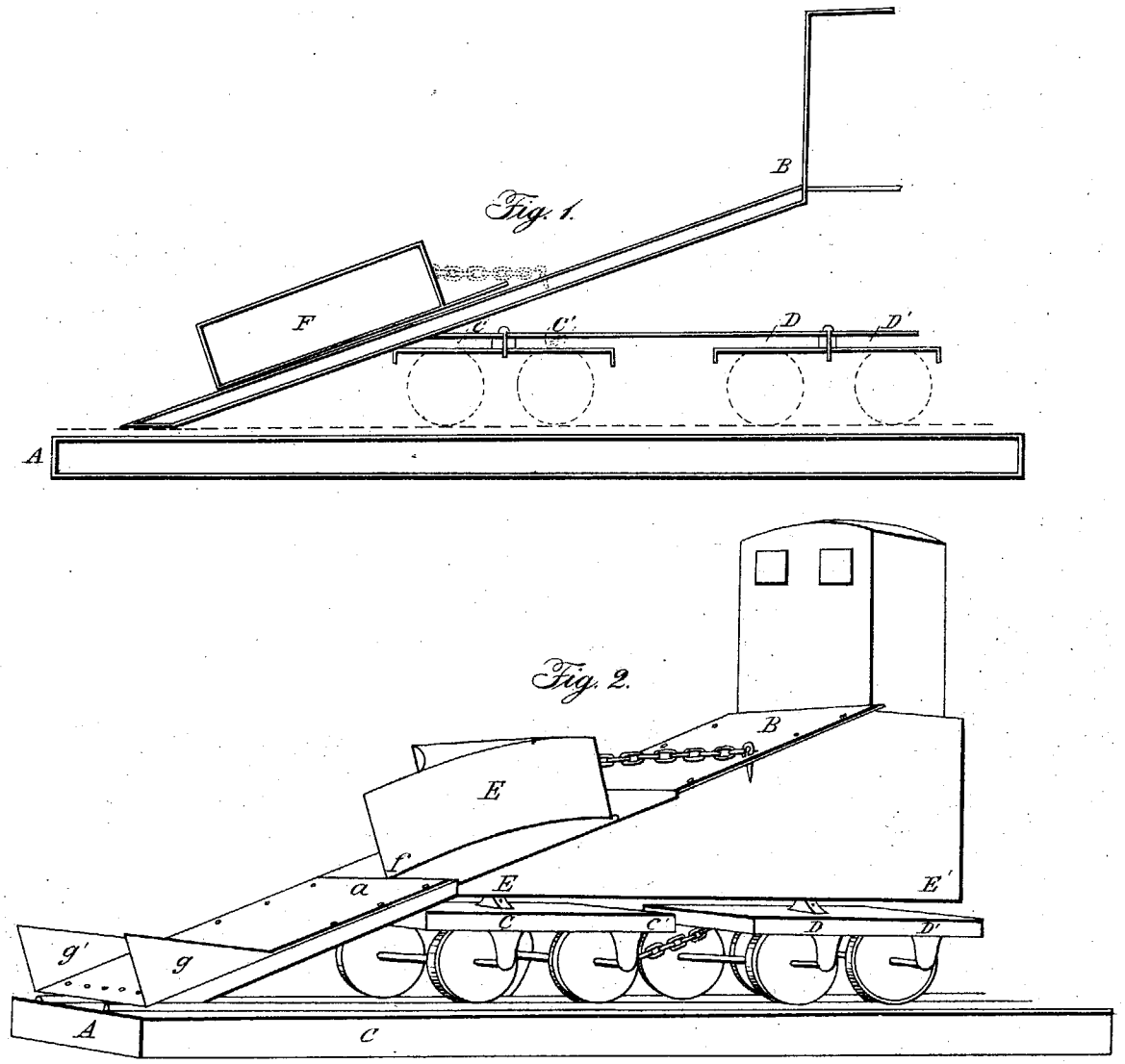
Witnesses:
J E Shaw
Geo E. Buckley
Inventor:
Samuel Richards
AM. PHOTO-LITHO. CO. N.Y. (OSBORNE'S PROCESS.)

United States Patent Office.

SAMUEL RICHARDS, OF PHILADELPHIA, PENNSYLVANIA.

*Letters Patent No.* 14,886, *dated May* 13, 1856; *reissue No.* 2,672, *dated July* 9, 1867.

IMPROVED SNOW-PLOUGH.

The Schedule referred to in these Letters Patent and making part of the same.

TO ALL WHOM IT MAY CONCERN:

Be it known that I, SAMUEL RICHARDS, of the city of Philadelphia, and State of Pennsylvania, have invented a new and useful Improvement for Removing Snow from Railroad Tracks; and I do hereby declare the following to be a full and exact description of the same, reference being had to the annexed drawings, making a part of this specification, in which—

Figure 1 is a vertical section, and

Figure 2 a perspective view of my improvement.

Snow-ploughs heretofore used for removing snow from railroad tracks have been designed and constructed with a view to press the snow directly from the track in a lateral direction. With this view they have been generally constructed of two vertical curved shares or surfaces, commencing at or very near to the point of the snow-plough, and immediately diverging laterally. In the use of such ploughs it has been found that in deep snows the snow becomes wedged or packed together at the sides of the track, making it very difficult for the plough and the cars to force their way through. By such ploughs, moreover, the snow is only temporarily pressed away at the sides, and after the plough has passed a considerable portion falls back on to the track again.

The nature of my improvement consists in constructing the snow-plough of a simple inclined plane, of great length, and of a width a little greater than the train, mounted upon two swivelling trucks, and commencing very near to the surface of the rails, and rising at a gradual angle for some distance, without any lateral projecting surfaces, until the inclined plane has reached to the depth of the snow. Then I place upon said plane a lateral-acting wedge, my object being by the action of the long, simple inclined plane, in the first instance, to raise up the snow entirely, and then to press off the snow, as elevated, by the lateral wedge on to the top of the surrounding snow, thereby securing the unobstructed elevation of the snow and the avoiding the lateral packing and jamming of the snow, as with the old ploughs, and the return of the snow after it has once been removed.

My improved snow-cleaner occupies a position in front of the locomotive, C C, and D D are two four-wheel swivelling trucks, which are supported by bolsters to a lower frame or support, E E′, in such a manner as to allow the trucks to pass freely around curves in the manner in which locomotive and car-trucks are now made to swivel. A B is a long inclined plane, made of metal or wood, and attached permanently to the lower piece E E′. The portion A is made to project in front of the truck *c c*. The plane A B rises from the point A gradually, say at an angle of about twenty to thirty degrees, and should be of a length of from twenty to thirty feet, or about the length of an ordinary eight-wheel freight car; (where the snows are light this plane might rise more rapidly.) This plane A B is of uniform level transversely as far as the vertical wedge piece F. This wedge piece F is so constructed as to present two vertical surfaces meeting at the point *f*, and rising from two to six feet, proportioned to the usual depth of snow in the section of country where the snow-cleaner is used. The entire piece F is made to slide up and down along the plane A B by means of a plate with a flange or rim fitting over the edges of A B, or by means of projections on the under side of F fitting into slots in the upper surface of A B. This sliding piece F is to be slid up and down until the point *f* is placed just at the height of the upper surface of the surrounding snow. The front vertical surfaces of F may have a double curvature, curving slightly inwards as they rise up, so as the more easily to deliver the snow raised from the track. on to the surface of the surrounding snow. When the piece F has been adjusted in the proper position for the depth of snow it can be secured there by means of pins or bolts, as shown in the drawing.

Having thus described my invention, what I claim, and desire to secure by Letters Patent, is—

1. The combination of a long inclined plane, B, mounted upon two swivelling trucks, the wedge piece F, mounted upon said inclined plane, with its point located above the level of the surrounding snow, so that the snow shall be elevated gradually by the plane B, at or near to the level of the surrounding snow, before it is pressed laterally by the wedge.

2. The wedge piece F, so arranged as to be movable up and down the inclined plane.

SAMUEL RICHARDS.

Witnesses:

J. E. SHAW,

GEO. E. BUCKLEY.